US006999487B2

(12) United States Patent
Ziolo

(10) Patent No.: US 6,999,487 B2
(45) Date of Patent: Feb. 14, 2006

(54) TERAHERTZ GENERATION PROCESSES AND IMAGING PROCESS THEREOF

(75) Inventor: Ronald F. Ziolo, Webster, NY (US)

(73) Assignee: Xerox Corporation, Stamford, CT (US)

( * ) Notice: Subject to any disclaimer, the term of this patent is extended or adjusted under 35 U.S.C. 154(b) by 38 days.

(21) Appl. No.: 09/971,399

(22) Filed: Oct. 5, 2001

(65) Prior Publication Data

US 2003/0066968 A1 Apr. 10, 2003

(51) Int. Cl.
*H01S 3/00* (2006.01)
(52) U.S. Cl. .............................. 372/37; 372/1
(58) Field of Classification Search .................... 372/1, 372/37
See application file for complete search history.

(56) References Cited

U.S. PATENT DOCUMENTS

| 3,427,565 | A | | 2/1969 | Birnbaum | |
|---|---|---|---|---|---|
| 3,582,817 | A | * | 6/1971 | Gilson | 372/37 |
| 3,681,710 | A | * | 8/1972 | Lary et al. | 372/37 |
| 3,705,364 | A | | 12/1972 | Takeshima | 332/18 |
| 4,474,866 | A | | 10/1984 | Ziolo | |
| 4,831,627 | A | * | 5/1989 | Campbell | 372/37 |
| 5,056,111 | A | | 10/1991 | Duling, III et al. | 375/37 |
| 5,362,417 | A | | 11/1994 | Ziolo | |
| 5,592,325 | A | | 1/1997 | Dodge et al. | 359/326 |
| 5,700,076 | A | | 12/1997 | Minich et al. | 353/31 |
| 5,937,118 | A | | 8/1999 | Komori | 385/27 |

FOREIGN PATENT DOCUMENTS

| EP | 0 522 817 | 1/1993 |
|---|---|---|

OTHER PUBLICATIONS

Del Barco et al., "High-Frequency Resonant Experiments in Fe8 Molecular Clusters", *Physical Review B. (Condensed Matter)* APS through AIP USA, vol. 62, No. 5, Aug. 2000, pp. 3018-3021.

Del Barco et al., "Spin-Phonon Avalanches in Mn12 Acetate", *Physical Review B (Condensed Matter)* APS through AIP USA, vol. 60, No. 17, Nov. 1999, pp. 11898-11901.

Del Barco et al., "Quantum Coherence in Fe8 Molecular Nanomagnets", *Europhysics Letters Eur. Phys. Soc.*, by EDP Sciences and Soc. Italiana Fisica France, vol. 47, No. 6, Sep. 15, 1999, pp. 722-728.

Chudnovsky et al., "Superradiance from Crystals of Molecular Nanomagnets", *Physical Review Letters APS USA*, vol. 89, No. 15, Sep. 20, 2002, pp. 157201.1-1157201.4.

Romalis et al., "Inhomogeneously Broadened Spin Masers", *Physical Review A (Atomic, Molecular, and Optical Physics)* APS through AIP USA, vol. 60, No. 2, Aug. 1999, pp. 1385-1402.

Bertram Schwarzschild, Hystereies Steps Demonstrate Quantum Tunneling of Molecular Spins, Jan. 1997, p. 17.

Eugene Chudnovsky, Quantum Hystereis in Molecular Magnets, Nov. 8, 1996, p. 938.

Debarco, et al, Quantum Coherence in $Fe_8$ Molecular Nanomagnets, Sep. 15, 1999, p. 722-728.

Richard Lipkin, T Rays for Two, Aug. 26, 1995, p. 136.

* cited by examiner

*Primary Examiner*—Minsun Oh Harvey
*Assistant Examiner*—Armando Rodriguez
(74) *Attorney, Agent, or Firm*—Eugene O. Palazzo; Fay, Sharpe, Fagan, Minnich & McKee, LLP

(57) ABSTRACT

A process including: magnetically energizing susceptible magnetic particles; and accumulating the resulting terahertz lasing mode output of the particles.

10 Claims, No Drawings

TERAHERTZ GENERATION PROCESSES AND IMAGING PROCESS THEREOF

REFERENCE TO COPENDING AND ISSUED PATENTS

Attention is directed to commonly owned and assigned U.S. Pat. Nos. 4,474,866, issued Oct. 2, 1984, entitled "Developer Compositions Containing Superparamagnetic Polymers" which application discloses a developer composition containing superparamagnetic polymers; U.S. Pat. No. 5,322,756, issued Jun. 21, 1994, entitled "Expedient Method for the Preparation of Magnetic Fluids and other Stable Colloidal Systems"; and U.S. Pat. No. 5,362,417, issued Nov. 8, 1994, entitled "Method of Preparing a Stable Colloid of Submicron Particles", which application discloses submicron particles which are dispersible to form an aqueous colloid. Also disclosed in the '417 patent is a method of forming the stable dispersion which includes providing an ion exchange resin, loading the ion exchange resin with an ion, and treating the loaded resin to form nanoscale particles. The resin and nanoparticles can be fluidized to form an aqueous stable colloid. Also of interest is U.S. Pat. No. 5,358,659, issued Oct. 25, 1994, entitled "Magnetic Materials with Single-Domain and Multidomain Crystallites and a Method of Preparation"; U.S. Pat. No. 6,048,920, entitled "Magnetic Nanocomposite Compositions and Processes for the Preparation and Use Thereof", which discloses a magnetic nanocomposite composition comprising from about 0.001 to about 60 weight percent of nanocrystalline particles of $Fe_3O_4$, and from about 40 to about 99.999 weight percent of a resin; U.S. Pat. No. 5,641,424, entitled "Magnetic Refrigerant Compositions and Processes for Making and Using"; and U.S. Pat. No. 4,457,523, issued Oct. 10, 1995, entitled "Ferrofluid Media Charging of Photoreceptors".

Attention is directed to commonly owned and assigned copending applications: U.S. Ser. No. 08/178,540 filed Jan. 7, 1994, entitled "Magnetic and Nonmagnetic Particles and Fluid, Methods of Making and Methods of Using the Same", which application discloses low optical density magnetic fluids for use in liquid development compositions and wherein a submicron particle size ion exchange resin may be selected to avoid further micronization or particle size reduction processing steps; U.S. Ser. No. 08/584,585 filed Jan. 11, 1996, entitled "Magnetic Nanocompass Compositions and Processes for Making and Using"; U.S. Ser. No. 08/600,664, filed Feb. 14, 1996, entitled "Superparamagnetic Image Character Recognition Compositions and Processes Of Making and Using"; and U.S. Ser. No. 08/674,306 filed Jul. 7, 1996, entitled "High Magnetization Aqueous Ferrofluids and Processes for Preparation and Use".

The disclosures of each the above mentioned references are incorporated herein by reference in their entirety. The appropriate components and processes of these references may be selected for preparing magnetic particles and imaging materials and for use in processes of the present invention in embodiments thereof.

BACKGROUND OF THE INVENTION

The present invention is generally directed to processes for generating terahertz radiation, more specifically, the present invention is directed to, in embodiments, to providing processes for producing terahertz radiation from lasing of magnetic particles having long lived metastable states at non-zero magnetic fields, and providing imaging processes comprising lasing the aforementioned magnetic particle composition and exposing an object, for example, a two or three dimensional image, to the terahertz radiation arising therefrom, thereby transforming the incident terahertz radiation into a resultant terahertz specular beam containing two or three dimensional image content, and thereafter processing the terahertz beam to extract and record the two or three dimensional image content therefrom. In other embodiments, the present invention provides processes for high density, high resolution imaging and image recording media, and processes thereof.

PRIOR ART

U.S. Pat. No. 5,937,118, to Komori, issued Aug. 10, 1999, discloses a device capable of obtaining an electromagnetic wave having an arbitrary waveform and an arbitrary frequency, generating an electromagnetic wave with an ultrahigh frequency, generating an electromagnetic wave with a variable frequency, and performing ultrafast optical control and optical modulation is provided. The quantum synthesizer of the present invention has a quantum synthesis portion comprising a number, n (n=an integer of 3 or more), of quantum wells provided in proximity to each other so as to be coupled together quantum-mechanically, each of the n number of quantum wells having the n number or number larger than n of coupled levels as a result of coupling, and is adapted to excite and synthesize the electron waves or polarizations of the respective levels, while controlling their phases and amplitudes, by means of coded light with phases and amplitudes controlled for predetermined frequencies (energies).

U.S. Pat. No. 5,056,111, to Duling et al., issued Oct. 8, 1991, discloses a communication system for transmitting and receiving terahertz signals which has an emitter employing a resonant radiating structure connected to an ultrafast switch. The switch is a subpicosecond photoconducting switch coupled to a coplanar transmission line having a pair of approximately 1 micron wide A1 lines deposited on an SOS substrate. The transmission line is separated from the tip of the radiating structure by a photoconducting gap forming the switch and is driven by a laser pulse. Utilizing the gap excitation principle, the transmitting antenna radiates a freely propagating signal that may be received by an identical structure either on the same or on different substrates.

U.S. Pat. No. 5,700,076, to Minich et al., issued Dec. 23, 1997, discloses a laser illuminated image producing system including a single light valve which not only serves to form an image, but also to increase the number of its colors. In another form of the invention, the lasers are sequenced at high input energy for short intervals of time to provide high average output luminosity at lower average energy costs.

U.S. Pat. No. 5,592,325, to Dodge et at., issued Jan. 7, 1997, discloses a method and associated structures for locating a laser beam that has a wavelength outside of the visible portion of the electromagnetic spectrum. The method comprises positioning a sample of a polycrystalline nonlinear frequency converting compound generally linearly downstream from a laser source, and then detecting the emission from the polycrystalline frequency converting compound to thereby identify the position of the original laser beam. In preferred embodiments, the polycrystalline nonlinear frequency converting compound comprises KTP.

U.S. Pat. No. 3,705,364, to Takeshima, issued Dec. 5, 1972, discloses an apparatus for generating microwaves comprising a cavity resonator, a microwave generating element and a solid-state variable reactance element such as a variable capacitance diode, both of these elements being disposed within the cavity resonator. It is possible to obtain a controlled and/or a modulated microwave output from the apparatus by varying the reactance of and/or by supplying a modulating signal to the variable reactance element.

Also of interest are: *Physics Today*, January 1997, p. 17, which discloses the relationship of hysteresis to quantum tunneling of spins; *Science*, vol. 274, Nov. 8, 1996, which discloses quantum hysteresis of molecular magnets; *Europhysics Letters*, vol. 47, no. 6, p. 722–728, 1999, which discloses quantum coherence in $Fe_8$ molecular nanomagnets, and *Science News*, vol. 148, 1995, p. 136, which discloses terahertz applications to imaging techniques.

Other references of interest disclose the preparation of magnetic compositions, such as manganese complexes, and includes U.S. Pat. Nos. 5,637,545; and 5,274,147.

The aforementioned references are incorporated herein by reference in their entirety.

SUMMARY OF THE INVENTION

Embodiments of the present invention, include providing:

Processes for overcoming, or minimizing deficiencies of prior art processes for terahertz and micron range radiation generation and imaging processes thereof, by providing media and processes with improved efficiency, improved flexibility, and improved operational economies;

A process comprising:

magnetically irradiating a composition comprising susceptible magnetic particles with a small net spin of about 10 such that the composition is selectively and effectively energized thereby effecting lasing and producing terahertz radiation;

exposing an object to the terahertz radiation thereby transforming the terahertz incident radiation into a terahertz specular beam containing object image content; and thereafter processing the terahertz specular beam to extract and record the object image content therefrom.

DETAILED DESCRIPTION OF THE INVENTION

Advantages of the present invention include: providing a technically simple source of terahertz radiation; providing both coherent and non coherent terahertz radiation; providing a terahertz laser(t-laser) or "taser" device which provides a multitude of selectable radiation frequencies, including microwave and terahertz wavelengths; providing a laser device which is tunable by the influence of an external magnetic field or light source; providing a lasing device and process based upon quantum spin states of the magnetic particles employed; and providing imaging processes for generating two and three dimensional recorded images.

The present invention provides a process comprising:

magnetically energizing susceptible magnetic particles; and accumulating the resulting terahertz lasing mode output of the particles.

The resulting lasing output of the process produces terahertz radiation with a wavelength from about 0.1 micrometers to about 1.0 meters and a power output of from about 0.01 to about 10 kilowatts per kilogram of susceptible magnetic particles. The power output estimate assumes 100 percent efficiency. The terahertz radiation produced can be either non-coherent or coherent, and the coherency properties can be selected by an operator considering a number of factors and as illustrated herein.

The magnetic particles can be any compounds which possess a low net spin, for example of 10 and above, and which compounds are sufficiently sensitive to energization, for example, by magnetic methods, to achieve necessary excitation levels, spin population densities and inversions, and radiative transfers to produce terahertz radiation.

Examples of suitable susceptible magnetic particles include $Mn_{12}O_{12}(OAc)_{12}(H_2O)_4$, and iron bromide triazacyclononane complex, reference the aforementioned U.S. Pat. Nos. 5,637,545; and 5,274,147; and *Angewandte Chemie, Int. Ed.* (*English*), Vol. 23, No. 1, p. 77, 1984, and include other related high spin molecular clusters.

The magnetic particles possess long lived metastable states at non-zero magnetic fields, for example, typical lifetimes can be from about 0.01 to about 100.0 microseconds, preferably of from about 0.1 to about 10.0 microseconds, and more preferably of from about 0.1 to about 1.0 microseconds. The non-zero magnetic fields can be from about 0.5 to about 5 Tesla, and the magnetic fields can depend upon the compound selected for the susceptible magnetic particles and the upon the frequencies of the resulting terahertz radiation that is desired.

The energizing of the magnetic particles causes the magnetic particles to exhibit a quantum mechanical magnetic property known as resonant magnetization tunneling (RMT) wherein the magnetic hysteresis curve possesses a plurality of steps. The plurality of steps of the magnetic hysteresis curve are from 2 about to about 21 and, although not wanting to be limited by theory, are believed to reflect the population and differentiation of all available spin states under the appropriate circumstances. The energizing or energization of the magnetic particles inverts degenerate spin population levels of the magnetic particles, specifically the spins associated with the molecular magnetic species therein, thereby inducing one or more lasing modes in the particles. The energizing can be accomplished by applying one or more magnetic fields to the particles and thereafter continuously reversing or inverting the applied magnetic field. Alternatively, the energizing can be accomplished by subjecting or exposing the magnetic particles to appropriate levels of electromagnetic radiation in amount of from about 10 gigahertz (GHz) to about 1 terahertz (THz). The irradiation power level can be of about 1 milliwatt to about 1 watt for various frequencies selected and used in the range from GHz to THz. These power levels can be readily achieved and used to boost magnetic irradiation or energization with, for example, commercially available lasers, such as argon-ion, krypton, and diode lasers.

The accumulating or accumulation of the resulting lasing mode output of the particles is accomplished for example, in a resonant cavity, such as any cavity useful in the GHz to THz range. See, for example, the aforementioned *Europhysics Letters*, vol. 47, no. 6, p. 722–728, 1999.

The magnetic particles can have any suitable volume average diameter. Although not wanting to be limited by theory it is believed that smaller particles rather larger particles provide superior properties and performance. Preferred magnetic particles sizes are from about 1.0 to about 100 nanometers and preferably have a narrow polydispersity of from about 1.0 to about 2.0 geometric size distribution (GSD).

The present invention in embodiments provides an imaging process comprising:

magnetically irradiating a composition comprising magnetic particles that contain molecular magnets with a small net magnetic spin, for example, of about 10 and above, such that the composition is selectively and effectively energized thereby effecting lasing and producing terahertz radiation;

exposing an object to the resulting terahertz radiation thereby transforming the incident terahertz radiation into a terahertz specular beam containing object image content; and thereafter processing the terahertz specular beam to extract and record the object image content therefrom. The object or objects can be, for example, any two dimensional image or a three dimensional image. The objects can also be, for example, a printed document, a printed document in a sealed envelope, a single printed document situated in a stack of printed documents, and preferably a printed document wherein the printed characters or images thereon contain magnetic particles, for example, as found in conventional magnetic ink character recognition (MICR) type toners and inks, and or magnetic particles containing molecular magnets as disclosed herein. Although not wanting to be limited by theory it is believed that printed images or characters formed from toners or inks containing magnetic particles containing molecular magnets are particularly preferred because of their propensity to interact with and alter the properties of the incident radiation. The recording of the image content can be accomplished with, for example, magnetic media, electrostatographic media, ionographic media, optical recording media, such as optical disc storage for example writeable compact disc or digital video disc devices, and the like media and methods, and combinations thereof.

Magnetic particles and dispersions thereof can be prepared in accordance with, for example, U.S. Pat. Nos. 4,474,866, 5,322,756, 5,362,417, 5,358,659, and references therein, the disclosures of which are incorporated herein by reference in there entirety, and which methods provide particles which possess high stability, high dispersibility, narrow particle size distributions, and can be made to be substantially free of secondary particles or generations.

As used herein, susceptible magnetic particles for terahertz generation or imaging includes molecular magnets which comprise molecules or molecular assemblies, such as complexes or clusters, with high spin values, such as of 10 and above, and high magnetic anisotropies.

In the present invention there are provided processes which can be used for imaging and memory devices and recording processes thereof, and wherein, for example, each magnetic species or qubit in the particle can, in effect, provide the equivalent of a single bit or pixel of recorded information.

Although not wanting to be limited by theory, it is believed that by varying the strength of the magnetic field or radiation source incident upon the susceptible magnetic particles, the energy or band gap between the ground state and the metastable state and the distance between other accessible levels can be selectively altered or controlled.

At high applied field sweep rates, for example, from about 10 milliTesla per second to about 150 milliTesla per second there is observed a concentration of all relaxations in a single resonance. Furthermore, the resonance which shows a total relaxation of the magnetization changes with the temperature. Thus two extrinsic parameters, magnetic field and temperature, can be readily manipulated and controlled to a high degree to achieve a change in the magnetic and terahertz emission behavior of the system. Using high sweep rates there was induced the aforementioned resonant magnetization tunneling (RMT) phenomena which afforded several important and unexpected consequences. First, the quantum tunneling magnetization (QTM) phenomena can be observed and exploited at temperatures greater than about 4.2 K (liquid helium temperature). Second, when the temperature was increased to about 8–10 K there was obtained a peak or maxim at the first resonance and which peak corresponds to a magnetic field of about 0.5 Tesla. Thus resonant magnetization tunneling can be achieved at temperatures and magnetic fields which can be readily attained. The resonant magnetization tunneling phenomena can be visualized as follows: when a molecule changes its magnetization by a quantum or thermal processes, the magnetization crosses an energy barrier and goes to an excited state or higher energy level. Before the magnetization falls to lower levels in another energy well some photons may be emitted in the process. These emitted photons can excite another molecule to higher levels and the relaxation becomes faster. If the field sweep rate is very high, many photons can act together making the relaxation faster for the entire system. In this process, a large amount of radiation can be emitted in a pulse of only about $10^{-3}$ seconds. The frequency band of this electromagnetic radiation corresponds to the microwave (THz) region of the electromagnetic spectrum.

The invention will further be illustrated in the following non limiting Examples, it being understood that these Examples are intended to be illustrative only and that the invention is not intended to be limited to the materials, conditions, process parameters, and the like, recited herein. Parts and percentages are by weight unless otherwise indicated.

EXAMPLE I

PROCEDURE FOR MAGNETIC PARTICLE PREPARATION. The preparation of magnetic compositions are available in the literature and include: U.S. Pat. Nos. 5,637,545, and 5,274,147, for manganese complexes, such as $Mn_{12}O_{12}(OAc)_{12}(H_2O)_4$; and *Angewandte Chemie, Int. Ed. (English)*, Vol. 23, No. 1, page 77, 1984, for magnetic organometallic complexes such as iron triazacyclononane compounds, the disclosures of which are incorporated herein by reference in their entirety.

EXAMPLE II

PROCEDURE FOR LASING THE MAGNETIC PARTICLES The detection, including both reading and lasing of the susceptible magnetic molecules and particles, of the emitted microwave radiation produced after the application of an appropriately energetic magnetic field is accomplished by using a commercially available spectrum analyzer coupled to a commercially available mixer device in order to achieve improved values for both selectivity and bandwidth. For writing information, the lasing mode of the susceptible magnetic molecules can also be excited using non-coherent microwave radiation. This radiation can be used to excite the spin levels to a certain spin level whereupon the quantum transition to the corresponding spin level located at another site of the potential well occurs. The spin decay from that level is the starting point for the microwave emission and of the lasing mode of the molecules.

Other modifications of the present invention may occur to one of ordinary skill in the art based upon a review of the present application and these modifications, including equivalents thereof, are intended to be included within the scope of the present invention.

What is claimed is:

1. An imaging process comprising:
   providing susceptible magnetic particles capable of being energized to produce a lasing output;
   magnetically energizing the susceptible magnetic particles to thereby produce a lasing output; and
   accumulating the resulting lasing output of the particles;
   wherein the lasing output is terahertz radiation with a wavelength from about 0.1 micrometers to about 1.0 meters and a power output of from about 0.01 to about 10 kilowatts per kilogram of the magnetic particles when the process is 100 percent efficient.

2. A process in accordance with claim 1, wherein the susceptible magnetic particles are selected from the group consisting of a $Mn_{12}O_{12}(OAc)_{12}(H_2O)_4$ compound, an iron bromide triazacyclononane complex, and mixtures thereof.

3. A process in accordance with claim 1, wherein the susceptible magnetic particles are selected from the group consisting of a compound and mixture of compounds, with a magnetic spin of 10.

4. A process in accordance with claim 1, wherein the susceptible magnetic particles have long lived metastable states with lifetimes from about 0.01 to about 10.0 microseconds at non-zero magnetic fields.

5. A process in accordance with claim 4, wherein the non-zero magnetic fields are from about 0.5 to about 5 Tesla.

6. A process in accordance with claim 1, wherein the step of magnetically energizing is accomplished by exposing the susceptible magnetic particles to electromagnetic radiation with a power range in an amount of from about 1 milliwatt to about 1 watt and with a frequency of from about 1 GHz to about 1 THz.

7. A process in accordance with claim 1, wherein the susceptible magnetic particles have a volume average diameter from about 1.0 to about 100 nanometers and a narrow polydispersity of from about 1.0 to about 1.5 geometric size distribution(GSD).

8. A process in accordance with claim 1, wherein the step of magnetically energizing causes the susceptible magnetic particles to exhibit quantum resonant magnetization tunneling and a magnetic hysteresis curve having a plurality of steps.

9. A process in accordance with claim 8, wherein the plurality of steps of the magnetic hysteresis curve is from about 2 to about 21 steps.

10. A process in accordance with claim 1, further comprising the step of tuning the lasing output by manipulating the magnetic field and the temperature.

* * * * *